US012705583B2

(12) United States Patent
Banatao et al.

(10) Patent No.: US 12,705,583 B2

(45) Date of Patent: Aug. 11, 2026

(54) END TO END PLATFORM TO MANAGE CIRCULAR ECONOMY OF WASTE MATERIALS

(71) Applicant: X Development LLC, Mountain View, CA (US)

(72) Inventors: Diosdado Rey Banatao, Los Altos Hills, CA (US); Karen R. Davis, Portola Valley, CA (US); Neil Treat, Los Gatos, CA (US); Artem Goncharuk, Mountain View, CA (US); Charles Spirakis, Los Altos, CA (US); Sujit Sanjeev, Burlingame, CA (US); Gearoid Murphy, Mountain View, CA (US); Lance Co Ting Keh, La Crescenta, CA (US); Rebecca Radkoff, San Francisco, CA (US); Taoran Dai, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 738 days.

(21) Appl. No.: 17/033,512

(22) Filed: Sep. 25, 2020

(65) Prior Publication Data

US 2022/0101277 A1 Mar. 31, 2022

(51) Int. Cl.

| | |
|---|---|
| ***G06Q 10/30*** | (2023.01) |
| ***G01J 3/28*** | (2006.01) |

(Continued)

(52) U.S. Cl.

CPC ............ *G06Q 10/30* (2013.01); *G01J 3/2823* (2013.01); *G06F 16/211* (2019.01); *G06N 20/00* (2019.01); *G06T 7/0012* (2013.01)

(58) Field of Classification Search

CPC ...... G06Q 10/30; G01J 3/2823; G06F 16/211; G06N 20/00; G06T 7/0012; G16C 20/70;

(Continued)

(56) References Cited

U.S. PATENT DOCUMENTS

| | | |
|---|---|---|
| 7,449,655 B2 | 11/2008 | Cowling et al. |
| 8,571,689 B2 | 10/2013 | Macharia et al. |

(Continued)

FOREIGN PATENT DOCUMENTS

| | | |
|---|---|---|
| CN | 104502309 A | 4/2015 |
| WO | 2014/186292 A1 | 11/2014 |

(Continued)

OTHER PUBLICATIONS

"News Release: NREL Pioneers cleaner route to upcycle plastics into superior products" (Year: 2019).*

(Continued)

*Primary Examiner* — Dennis W Ruhl

(74) *Attorney, Agent, or Firm* — Mughal Gaudry & Franklin PC

(57) ABSTRACT

Systems and methods for managing chemical recycling processes include accessing characterization data of a feedstock, the characterization data comprising one or more spectra collected according to one or more spectroscopic methods. The methods include predicting, using the characterization data, a set of constituent materials included in the feedstock. The methods include predicting a material composition of the feedstock using the predicted set of constituent materials. The methods include identifying, at least in part using the predicted material composition of the feedstock, one or more target products. The methods include generating a set of chemical reaction schemas enabling a conversion of at least part of the feedstock into the one or more target products. The methods also include storing (Continued)

identifications of the material composition of the feedstock, the one or more target products, and the set of chemical reaction schemas in a data store.

16 Claims, 5 Drawing Sheets

(51) Int. Cl.

| | |
|---|---|
| ***G06F 16/21*** | (2019.01) |
| ***G06N 20/00*** | (2019.01) |
| ***G06T 7/00*** | (2017.01) |

(58) Field of Classification Search

CPC ........ G16C 20/10; G16C 20/20; G16C 20/90; Y02W 90/00

See application file for complete search history.

(56) References Cited

U.S. PATENT DOCUMENTS

| | | | | |
|---|---|---|---|---|
| 9,261,865 | B2 | 2/2016 | Morrison et al. | |
| 9,274,052 | B2 | 3/2016 | Tin | |
| 10,310,457 | B2 | 6/2019 | Nandigam et al. | |
| 11,353,394 | B2 * | 6/2022 | Murphy | G01J 3/28 |
| 2010/0222917 | A1 * | 9/2010 | Bohlig | B07C 5/342<br>235/375 |
| 2010/0290032 | A1 | 11/2010 | Bugge | |
| 2011/0087470 | A1 * | 4/2011 | Hames | G16B 5/00<br>703/2 |
| 2014/0332994 | A1 | 11/2014 | Danes et al. | |
| 2017/0131728 | A1 * | 5/2017 | Lambert | G05D 11/139 |
| 2018/0243800 | A1 | 8/2018 | Kumar et al. | |

FOREIGN PATENT DOCUMENTS

| | | | |
|---|---|---|---|
| WO | 2019/089825 | A1 | 5/2019 |
| WO | 2020/058237 | A2 | 3/2020 |

OTHER PUBLICATIONS

International Application No. PCT/US2021/044790, International Search Report and Written Opinion, Mailed On Nov. 19, 2021, 12 pages.

Roh et al., "Identification of Black Plastics Realized with the Aid of Raman Spectroscopy and Fuzzy Radial Basis Function Neural Networks Classifier", Journal of Material Cycles and Waste Management, vol. 19, Issue 3, May 2, 2017, pp. 1093-1105.

Scott et al., "Identification of Plastic Waste Using Spectroscopy and Neural Networks", Polymer Engineering and Science, vol. 35, No. 2; Available Online at: https://onlinelibrary.wiley.com/doi/epdf/10.1002/pen.760351208, Jun. 1995, pp. 1011-1015.

Office Action for Australian Patent Application No. 2021348146, dated Jan. 29, 2024.

Office Action for Japanese Patent Application No. 2023-518152, dated Jun. 11, 2024.

Vo Dong, Phoung Anh et al., "Economic and environmental assessment of recovery and disposal pathways for CFRP waste management", 2019.

English Translation of Decision of Refusal for Japanese Patent Application No. 2023-518152, dated Jan. 24, 2025.

Invitation to Amend for Singapore Patent Application No. 11202302058Y, dated Nov. 15, 2025.

Office Action for Thailand Patent Application No. 2301001754, dated Aug. 5, 2025.

Examination Report for Australian Patent Application No. 2025200551, dated Dec. 16, 2025.

Office Action for Chinese Patent Application No. 202180065792.9 dated Dec. 9, 2025.

Notice of Allowance for Chinese Patent Application No. 2021800657929, dated Mar. 20, 2026.

Office Action for Indonesian Patent Application No. P00202303438, dated Apr. 27, 2026.

* cited by examiner

END TO END PLATFORM TO MANAGE CIRCULAR ECONOMY OF WASTE MATERIALS

BACKGROUND

Plastic products are predominantly single-use and frequently not recycled. Annual production of plastic worldwide is approximately 350 million tons, of which approximately 10% ends up being recycled, 12% is incinerated, and the remainder (78%) accumulates in landfills or the natural environment, where it takes nearly 500-1,000 years to degrade. Plastic production is expected to double by 2030 and triple by 2050.

Mechanical recycling is the dominant strategy for recycling plastic and involves grinding, melting, and re-extruding plastic waste. High contamination rates and mixed material streams are major contributors to the low yield and low value of recycling processes, because recycling facilities are frequently designed to process streams of sorted materials with high purity, to retain a high level of material performance in recycled products. Feedstock impurity reduces the effectiveness of recycling, due to complex formulations with additives, as well as the physical degradation of materials, even just after a few cycles of mechanical recycling. For example, with plastic materials, polylactic acid (PLA) is a common waste plastic often undetected in polyethylene terephtalate (PET) sorting and mechanical recycling operations. As another example, chlorinated compounds such as polyvinyl chloride (PVC) are not tolerated in both mechanical and chemical recycling operations, because corrosive compounds are produced during recycling processes, which limits the value of hydrocarbon outputs.

SUMMARY

Techniques are provided (e.g., a method, a system, non-transitory computer-readable medium storing code or instructions executable by one or more processors) for managing reuse of molecular components incorporated in waste materials.

In particular, techniques may be directed to characterizing chemical or material identities of constituent materials entering a waste stream. The constituent materials may be identified using chemical fingerprints derived from a comprehensive library including spectrum information, physical properties, computational algorithms, and machine learning. Material characterization data may be used to develop chemical processes that transform the materials into target products. Identification of the target products and processes can be informed by logistical information, market data, and real time exchange data. For example, target products may be identified as ones associated with relatively high market demand and that can be relatively efficiently produced using at least one the constituent materials.

In some embodiments, a method may include accessing characterization data of a feedstock. The characterization data may include one or more spectra collected according to one or more spectroscopic methods. The method may include predicting, using the characterization data, a set of constituent materials included in the feedstock. The method may include predicting a material composition of the feedstock using the predicted set of constituent materials. The method may include identifying, using the predicted material composition of the feedstock, one or more target products. The method may include generating a set of chemical reaction schemas enabling a conversion of at least part of the feedstock into the one or more target products. The method may also include storing identifications of the material composition of the feedstock, the one or more target products, and the set of chemical reaction schemas in a data store.

In some embodiments, the method may also include identifying one or more inputs to a fitness function, the one or more inputs describing a chemical reaction scheme of the set of chemical reaction schemas. The method may also include generating an output of the fitness function using the one or more inputs. The method may also include selecting an implementation scheme from the set of chemical reaction schemas according to the fitness function, the one or more inputs, and the one or more target products. Identifying the one or more target products may include accessing inventory information describing a set of products and identifying an incomplete subset of the set of products as the one or more target products using the inventory information. The inventory information may include one or more of a quantity of the feedstock available for conversion or a quantity of a target product of the one or more target products available in a geographical region. The method may further include directing a portion of the feedstock to a materials recycling facility configured to convert the portion of the feedstock to at least one target product of the one or more target products. Generating a set of chemical reaction schemas may include accessing a chemical reaction inventory, the chemical reaction inventory including representations of chemical reactions describing a conversion of the feedstock to a target product of the one or more target products and populating the set of chemical reaction schemas from the chemical reaction inventory. Generating the set of chemical reaction schemas may include simulating a first constituent reaction of a chemical reaction scheme of the set of chemical reaction schemas using a machine learning model. Generating the set of chemical reaction schemas may include estimating an output of a reward function, with an output of the machine learning model serving as an input to the reward function. Generating the set of chemical reaction schemas may also include estimating a maximum of the reward function by modifying an input to the machine learning model, wherein the input is an output from a second constituent reaction preceding the first constituent reaction in the chemical reaction scheme.

In some embodiments, a computer system includes one or more processors and a memory in communication with the one or more processors, the memory configured to store computer-executable instructions, wherein executing the computer-executable instructions causes the one or more processors to perform one or more aspects of the method described above.

In some embodiments, a computer-readable storage medium stores computer-executable instructions that, when executed, cause one or more processors of a computer system to perform one or more aspects of the method described above.

DETAILED DESCRIPTION

Figure 1:
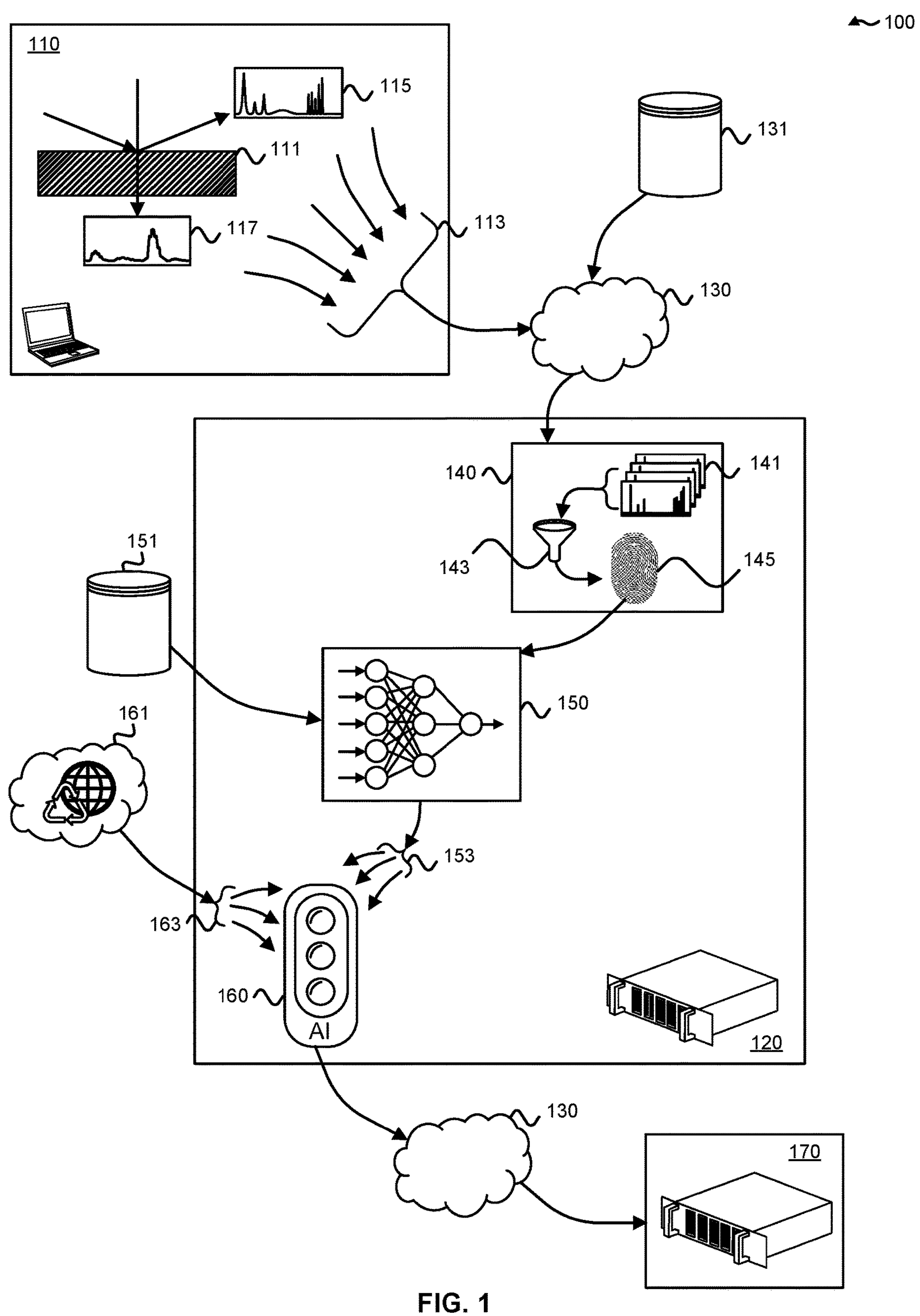
FIG. 1 illustrates an example technique for managing reuse of molecular components of a feedstock, in accordance with some embodiments of the present disclosure.

Mechanical recycling is limited in its applicability to mixed, composite, and contaminated waste streams, in part because it employs mechanical separation and reformation processes that are insensitive to chemical contaminants and may be unable to modify the chemical structure of waste material. Chemical recycling may resolve the limitations of mechanical recycling by breaking the chemical bonds of waste materials into smaller molecules. For example, in the case of polymeric materials, chemical recycling may provide an avenue to recover oligomers, monomers, or even basic molecules from a plastic waste feedstock. In the case of polymers, chemical recycling processes may include operations to depolymerize and dissociate the chemical makeup of a complex plastic product, such that its by-products can be up-cycled into feedstocks for new materials.

Elements of chemical recycling may permit a material to be repeatedly dissociated into primary feedstock materials. In this way, rather than being limited by chemical structure and material integrity to a limited number of physical processes, as in mechanical recycling, chemical recycling may be integrated into an 'end-to-end' platform to facilitate reuse of molecular components of recyclable materials. For example, the products of chemical recycling may include basic monomers (ethylene, acrylic acid, lactic acid, vinyl, etc.), feedstock gases (carbon monoxide, methane, ethane, etc.), or elemental materials (sulfur, carbon, etc.). Instead of being limited to a single group of recycled products, based on the molecular structure of the input waste material, products may be identified that can be synthesized from intermediary chemicals that can be produced from the waste by chemical reactions. In so doing, the end-to-end platform may manage a waste stream by generating a chemical reaction scheme to convert the waste material into one or more target products. For example, the end-to-end platform may directed a waste feedstock to a chemical recycling facility, for chemical conversion of the waste material into a target product. In this way, the end-to-end platform may improve implementation of reuse and recycling strategies and may increase diversion of waste materials away from disposal and into recycling systems.

The end-to-end platform may collect data describing quantities of waste materials, molecular components, and finished products, and, with this information, actively manage recycling processes to produce the target products. Chemical reaction schemes may be modified or updated using the data to change target product quantities, endpoints, or chemical structures. For example, the conversion of waste into feedstock monomers and back into raw polymers may be tracked and integrated into local, regional, and/or global waste recycling or up-cycling systems. Systems may include recycling operators, such as chemical processors, material recycling facilities, waste sources, and endpoints for refined polymer feedstocks. In turn, waste sources may include, but are not limited to, industrial, institutional, or domestic waste sources. Downstream processors may incorporate pure material products of chemical recycling without receiving repurposed waste materials.

A potential advantage of the chemical recycling processing schemes described herein include producing products from waste materials that are unavailable through mechanical recycling and that may increase the proportion of waste materials that can be recycled. For example, a plastic feedstock may be converted into a non-plastic material altogether, such as a hydrocarbon gas, which can in turn be synthesized into a new and different polymer material. Furthermore, assisted chemical process development, implementing machine learning features, can potentially decrease process development timelines and increase the efficiency of chemical recycling processes so that they can be viable at large-scale. For example, the embodiments described herein may include accelerating a development timeline for new chemical reaction schemes from bench scale, to pilot scale, and finally to industrial scale, which typically may take as long as 17 years, to a real-time process using multi-scale simulation of chemical recycling processes that are already active in a logistical network.

A further advantage may potentially address a limitation of conventional recycling methods that typically are devised to process relatively pure waste streams, with minimal contaminants. The techniques described herein may improve recycling processes by characterizing waste materials and managing recycling schemes to produce desired products with improved efficiency and performance. Advantages may include, but are not limited to, yield of product per weight of waste material, energy consumption, environmental impact of recycling processes, or the proportion of recyclable waste that is diverted to landfill or that is disposed in water bodies.

FIG. 1 illustrates an example workflow 100 for managing reuse of molecular components of a feedstock, in accordance with some embodiments of the present disclosure. In general, the workflow 100 may include one or more systems for characterizing a waste material, predicting the composition of the waste material, and developing a chemical recycling protocol for the waste material, through which the waste material may serve as a feedstock to be converted to a target product or products by one or more chemical recycling processes.

In some embodiments, the workflow 100 may include a materials characterization system 110 that may be implemented as a point-of-use device, such as a tablet, smartphone, laptop computer, or a specialized sensor device that may include one or more sensor tools to facilitate spectroscopic, imaging, or chemical characterization of a waste material 111. The waste material 111 may be or include a material that may serve as a feedstock of a recycling process. For example, the waste material 111 may be or include a commonly recycled material, such as polyethylene terephthalate (PET), such that the waste material 111 may be labeled prior to characterization as a feedstock for a recycling process. In some cases, the waste material 111 can also include contaminants or additives that may be identified by analysis by the characterization system 110, and that may inform the use of the waste material 111 as a feedstock, as described in more detail below. In some cases, waste material 111 may be labelled with additional metadata to inform subsequent analysis of the material as part of the workflow 100. For example, the label may be or include a CAS number, which may permit standard characterization data to be retrieved or accessed from a database of standard data.

The materials characterization system 110 may provide one or more types of characterization data 113 describing the waste material 111. The characterization data 113 may include spectroscopic data generated by measuring the interaction of light of one or more wavelengths with the waste material 111. For example, the characterization data 113 may include, but is not limited to, spectroscopic methods such as surface light reflectance/absorbance data 115, transmission absorbance data 117, or hyperspectral image data, measured by irradiating the waste material 111 with light in one or more spectral ranges. In some cases, the characterization data 113 may include infrared absorbance data, infrared reflectance data, visible absorbance or reflectance data, near-infrared data, ultraviolet absorbance data, or microwave or x-ray interaction data (e.g., x-ray fluorescence). In some embodiments, the characterization data 113 may include physical and chemical characterization including, but not limited to, surface resistivity data, physical characterization data such as hardness or tensile properties, or other physical or chemical properties that may contain characteristic information to differentiate the waste material 111 from other types of waste materials.

In some embodiments, the waste material 111 may include, but is not limited to, polymers, plastics, composite materials containing plastics, non-plastics, ligno-cellulosic materials, metal, glass, and/or rare-earth materials. The polymeric and plastic materials may include materials formed by one or more polymerization processes and may include highly cross-linked as well as linear polymers. In some cases, the waste material 111 may include additives or contaminants. For example, a plastic material may include a plasticizer, flame retardant materials, impact modifiers, rheology modifiers, or other additives included in the waste material 111, for example, to impart desired properties or facilitate formation properties. In some cases, the waste material 111 may incorporate a constituent chemical or element that may be incompatible with a broad range of chemical recycling processes, and, as such, the characterization data 113 may include information specific to such chemicals. For example, decomposition of halogen or sulfur containing polymers may produce corrosive byproducts that may inhibit or impair chemical recycling of waste materials 111 that include such elements. An example of a waste material 111 containing a halogen constituent is polyvinyl chloride (PVC). Decomposition of PVC, for example, may generate chlorine containing compounds that may act as corrosive byproducts.

Once collected, the characterization data 113 may be accessed by a computer system 120 implementing one or more elements of the workflow 100. In some embodiments, the computer system 120 may include a server, one or more servers, a virtual machine, multiple virtual machines, that may be implemented in a physical computer system or in a distributed computer system (e.g., cloud computing system). In some cases, the computer system 120 may communicate with one or more external systems, such as the materials characterization system 110, over a network 130. The network may be a public network, such as the internet, or may be a private network, such as a client network, a restricted network, or a local area network.

In some embodiments, the computer system 120 may execute a process for predicting a set of constituent materials included in the waste material 111. As described in more detail in reference to FIG. 2, below, the computer system 120 may access a library of spectra corresponding to one or more spectroscopic methods. For example, a database 131 may contain spectroscopic data for multiple standard materials, combinations of materials, as well as empirical characterization data for real-world materials. In some embodiments, the database 131 may communicate with the computer system 120 over the network 130. Additionally, the computer system 120 may store at least a portion of the library of spectra in memory of the computer system 120.

In some embodiments, predicting the set of constituents included in the waste material 111 may include executing a material identification application 140. The material identification application 140 may include a spectral analyzer 143 receiving the characterization data 113. In some embodiments, spectral data 141 may also serve as an input into the spectral analyzer 143, which may be provided by accessing the library of spectra, either in memory of the computer system 120 or from the database 130. In some embodiments, the spectral data 141 may be simulated or empirically measured. As described below, the material identification application 140 may identify one or more bands of interest in the characterization data 113 and may use the one or more bands of interest as part of generating a chemical fingerprint 145 of the waste material 111. Broadly, the chemical fingerprint 145 of the waste material 111 describes a set of characteristic information, derived from the characterization data 113, that can identify the material components of the waste material 111, for example, that can be introduced as feedstocks into a chemical recycling process.

In the context of the material identification application 140, the chemical fingerprint 145 may describe a prediction of the constituent materials and material composition making up the waste material 111, based at least in part on the characterization data 113 and the spectral data 141. For example, the chemical fingerprint 145 may describe the principal component compounds and additives or contaminants indicated by the characterization data 113. The chemical fingerprint 145 may also describe the relative composition of each constituent material making up the waste material 111, for example, when the characterization system 110 implements a calibrated spectroscopic method facilitating absolute composition methods. In some embodiments, the material composition may be predicted based on standard data or may be predicted as part of machine learning models trained using data sets including information from blended materials, as described in more detail in reference to FIG. 2, below.

Figure 3:
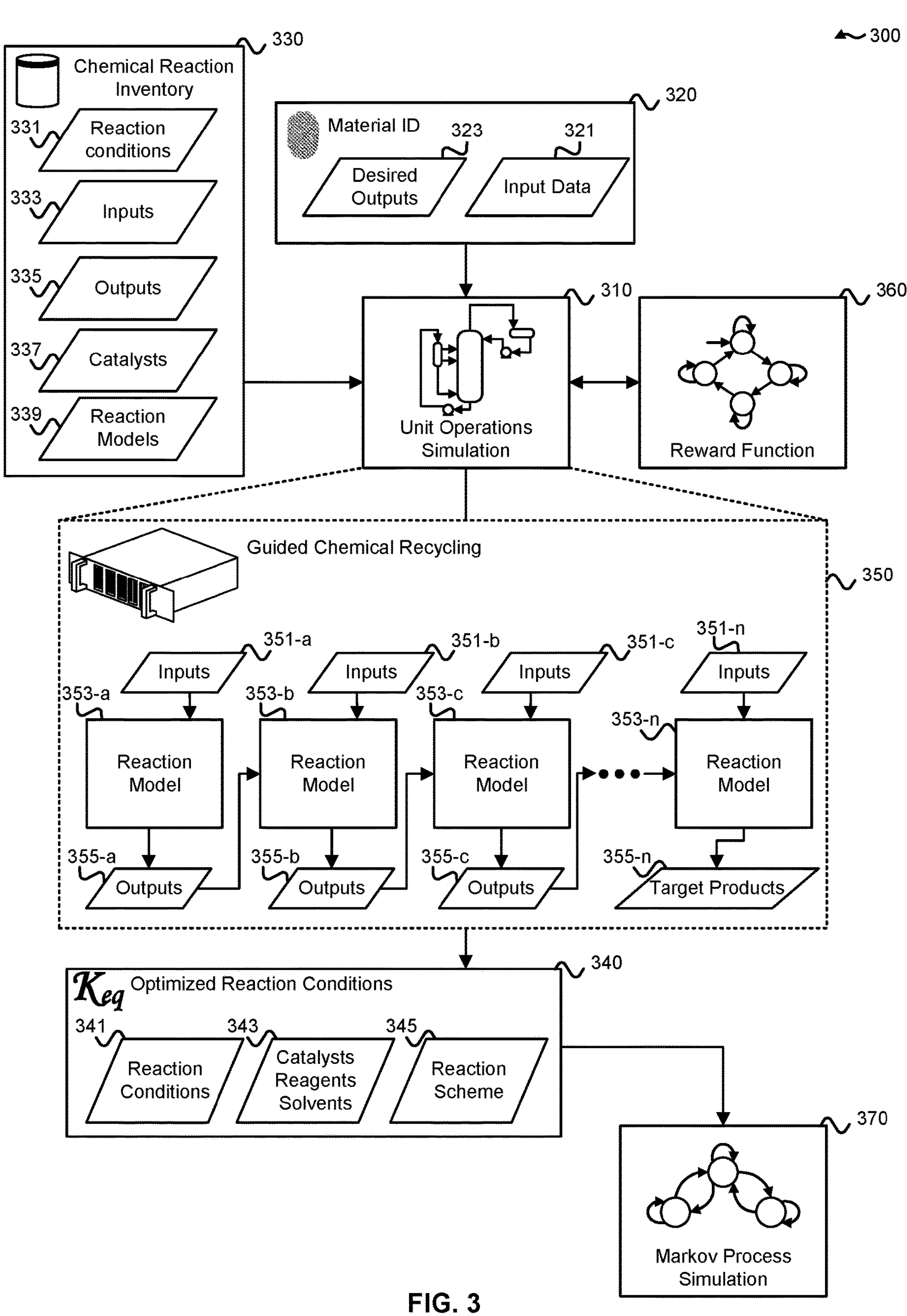
FIG. 3 illustrates an example workflow for generating a set of chemical reaction schemas, in accordance with some embodiments of the present disclosure.

As described in more detail in reference to FIG. 3, the chemical fingerprint 145 may permit the identification of one or more target or desired chemical recycling products. For example, in some embodiments, the computer system 120, as part of executing the material identification application 140 may access chemical reaction inventory information describing one or more products, such as a set of products, that may be generated by a chemical recycling process taking in the waste material 111 as a feedstock. For example, the computer system 120 may identify the bands of interest, from which the computer system 120 may also provide one or more target or desired products that can be produced from the waste materials 111. The identification of the target products may be facilitated by accessing chemical recycling process data, such as feedstock-product pairings, as in a searchable table (e.g., a lookup table), as described in more detail in reference to FIG. 3. As an illustrative example, a chemical fingerprint 145 may be used to predict that the waste material 111 can be or include PET, with one or more additives or impurities that may eliminate one or more potential chemical recycling processes or may result in balance or adjustment of feedstock ratios to allow for recycling and/or reduced wear and tear on recycling process systems. From this information, the computer system 120 may access the chemical reaction data to provide information describing one or more target products. In this example, the computer system 120 may cross-reference the chemical reaction data for feedstocks with those of impurities, additives, and contaminants, to reduce a likelihood that a target product is improperly identified.

Additionally or alternatively, the computer system 120 may receive one or more desired product identifications from a user of the computer system 120, as a manual input based on the chemical fingerprint 145. For example, the computer system may include a user interface or console application by which one or more users may interact with one or more applications of the computer system 120. In some embodiments, the user interface may permit a user to review the data making up the chemical fingerprint 145, conduct a search of potential chemical recycling products, and indicate one or more desired products.

In some embodiments, the computer system 120 may execute a chemical reaction modelling application 150 that may permit the computer system 120 to simulate one or more chemical recycling processes for which the waste material 111 acts as a feedstock to generate the one or more target or desired products. The chemical reaction modelling application 150, as described in more detail in reference to FIG. 3, below, may access one or more representations of chemical reactions describing the conversion of feedstock materials to target products, which may be stored in a database of chemical reaction data 151. The chemical reaction data can be or include a machine-searchable catalogue of basic chemical reactions for depolymerizing polymers, for dissociating covalent bonds in chemical reactants, or for converting the waste material 111 physically or chemically to the target products.

In some embodiments, the database of chemical reaction data 151 can be or include a chemical reaction inventory that may serve as an initial set of chemical reactions inputted into a chemical process simulation, as described in more detail in reference to FIG. 3. As with the database 131, the database of chemical reaction data 151 may be a network data store or a memory device in the same physical location as the computer system 120. In some cases, the chemical fingerprint 145 may serve as an additional input to the chemical reaction modelling application 150. For example, the chemical fingerprint 145 may include information describing phases, structures, and quantities of one or more feedstocks and products, as described previously. In this way, the inputs to the chemical reaction modelling application 150 may be or include input molecules, output molecules, catalysts, reagents, solvents, as well as chemical processing parameters including, but not limited to, residence time, reaction temperature, reaction pressure, or mixing rates and patterns.

In some embodiments, the chemical reaction modelling application 150 may be or include one or more unit operation models, that may be implemented to simulate constituent reactions of a scheme 153 of chemical reactions. The chemical reaction modelling application 150 may generate multiple chemical reaction schemas 153, which may include different constituent reaction processes or describe different reaction products. In some embodiments, the chemical reaction modelling application 150 may simulate one or more of the unit operation models using a machine learning model, such as an artificial neural network implementing deep learning features, "black box" optimization techniques, supervised learning, reinforcement learning, or other canonical machine learning approaches. In this way, when the chemical reaction scheme 153 includes multiple constituent reactions, as represented in a series of unit operation models, the chemical reaction modelling application 150 may implement one or more machine learning models for which an output of a first model serves as an input of a second model. As described in more detail in reference to FIG. 3, the chemical reaction modelling application 150 may implement model tuning protocols through a reward function, which may permit modifying one or more parameters of the unit operation models iteratively to optimize or improve the models. In some embodiments, tuning the models may include estimating an output of the reward function as a function of one or more values calculated by the chemical reaction modelling application 150, and modifying one or more model parameters to maximize the output of the reward function. In addition to the reward function, training of the machine learning models, implemented as part of the chemical reaction modelling application 150, is described in more detail, below.

In some embodiments, one or more unit operations models may be based on first-principles, rather than a machine learning approach. As an illustrative example, a chemical recycling process, such as a polymer catalytic decomposition unit operation, may be simulated by chemical rate equations for which the input variables may be supplied, for example, by preceding unit operation models or by heuristics from a table lookup. In this way, a series of unit operation models simulated by the chemical reaction modelling application 150 may include both machine learning models and first-principles models. In some embodiments, as when the material characterization system 110 includes an on-line sensor system as part of a material sorting process, the chemical reaction modelling application 150 may access or receive chemical fingerprint 145 data progressively, and may update reaction schemas 153 in response to receiving updated information. Real time updating of chemical reaction simulations may improve the performance of the chemical recycling process managed by the computer system 120. For example, the waste material 111 may be redirected from an initial recipient destination to another following an update to the chemical reaction schemas 153, which may improve one or more performance factors, described below.

In some embodiments, the chemical reaction schemas 153 or constituent chemical unit operations may be filtered by one or more selection operations executed by the computer system 120. For example, a fitness function may be defined by which an implementation scheme may be selected, as described in more detail in reference to FIGS. 3-4, below. A fitness function may be an object model having multiple inputs that can include, but are not limited to, predicted input quantities, output quantities, energy input values, cooling water demands, material cost, or fuel consumption by logistical operations involved in transporting the waste material 111. In some embodiments, the fitness function may receive derived values as inputs including, but not limited to reaction yield, conversion efficiency, chemical reaction selectivity, heat balance values, energy consumption, or environmental impact. Environmental impact may describe the production of regulated byproducts including, but not limited to, greenhouse gases, chemical effluents, or vitrified slag. For example, the "Green Degree" method can be used to establish an integrated index that enables comprehensive quantitative measurement of the environmental impact and sustainability of proposed reaction conditions. Similarly, "Principles of Green Chemistry & Life Cycle Assessment" can be used to promote safe processes that minimize generation of hazardous substances. In some embodiments, each parameter provided to the fitness function may be given a weight that may influence the favorability of a given chemical reaction scheme 153 or constituent chemical unit operation.

The chemical reaction modelling application 150 may provide outputs including the chemical reaction schemas 153 to an optimization engine 160. The optimization engine 160 may be or include a machine learning model, and may facilitate real time modification or selection of the chemical reaction schemas 153 based on inputs including, but not limited to, those generated by the chemical reaction modelling application 150, the chemical fingerprint 145, or inventory information 163. In some embodiments, the inventory information 163 may be accessed from a networked system of recycling information 161. The recycling information 161 may be stored in a database that is updated progressively, such as in real time, that may detail material supply chains, and may track waste feedstock through decomposition and then re-synthesis into new materials. For example, the inventory information 163 can include a quantity or a quality of the feedstock available in a logistical network, which may correspond to a geographical region. Similarly, the inventory information 163 may include inventory information of the target products available in a geographical region.

In some embodiments, the optimization engine 160 may modify the target or desired products that serve as inputs to the chemical reaction modelling application 150 using the inventory information 163. For example, the computer system 120 may access the inventory information 163. Using the inventory information 163 the computer system 120 may identify a subset of a larger number of target products to limit the number of chemical reaction schemas 153 generated. As an illustrative example, a waste material 111 may be identified as a potential feedstock for a number of chemical recycling methods providing multiple possible reaction products. Through accessing inventory information 163 corresponding to the possible reaction products, a selection of one or more of the possible reaction products may be made to target products whose supply is limited, to avoid oversupply of a product that is already prevalent, or to generate products whose consumption reflects a likelihood of high demand. In some embodiments, as described in more detail in reference to FIG. 4, below, a real time exchange may connect recyclers, chemical companies, and other consumers or producers of recyclable materials. The real time exchange may implement inventory planning, supply and demand management, a recycled products marketplace, and logistics management. For example, the computer system 120 may direct the waste material 111, or a portion of the waste material 111, to a material recycling facility or other processing operation, where the waste material 111 may be converted into a target product or multiple target products. An example of directing the waste material 111 may include identifying a receiver facility and a sender facility, and generating logistical information that may be provided to the receiver facility or the sender facility.

As part of implementing a chemical recycling process for the waste material 111, the computer system 120 may provide one or more of the chemical reaction schemas 153, the model outputs, the chemical fingerprint 145, the characterization data 113, or other information generated, processed, or accessed by the computer system 120, to an external computer system 170. The external computer system 170 can be or include a control server at a materials recycling facility. For example, the computer system 120 may receive the characterization data 113 from an on-site characterization system 110 including multiple sensors and probes, may generate the chemical reaction schemas 153, as described above, and may provide the chemical reaction schemas 153 and/or and implementation schema to the external computer system 170 to execute using the chemical process units of the materials recycling facility. In this way, the external computer system 170 may receive the information from the computer system 120 over the network 130.

In some embodiments, the computer system 120 may store the same or similar information in a data store, such as database 131 or chemical reaction inventory database 151. For example, the computer system 120 may maintain the chemical reaction inventory by storing representations of all chemical inputs and outputs of reactions, and the catalysts and reaction conditions involved. The information stored in the chemical reaction inventory may then be used to optimize known and widely used reactions and to assist in the exploration and discovery of novel catalysts and reaction conditions that might be applicable to deconstruct plastic waste. Similarly, bands of interest, developed by the material identification application 140, may be stored for training and improvement of material fingerprinting approaches, as described in more detail in reference to FIG. 2, below.

Figure 2:
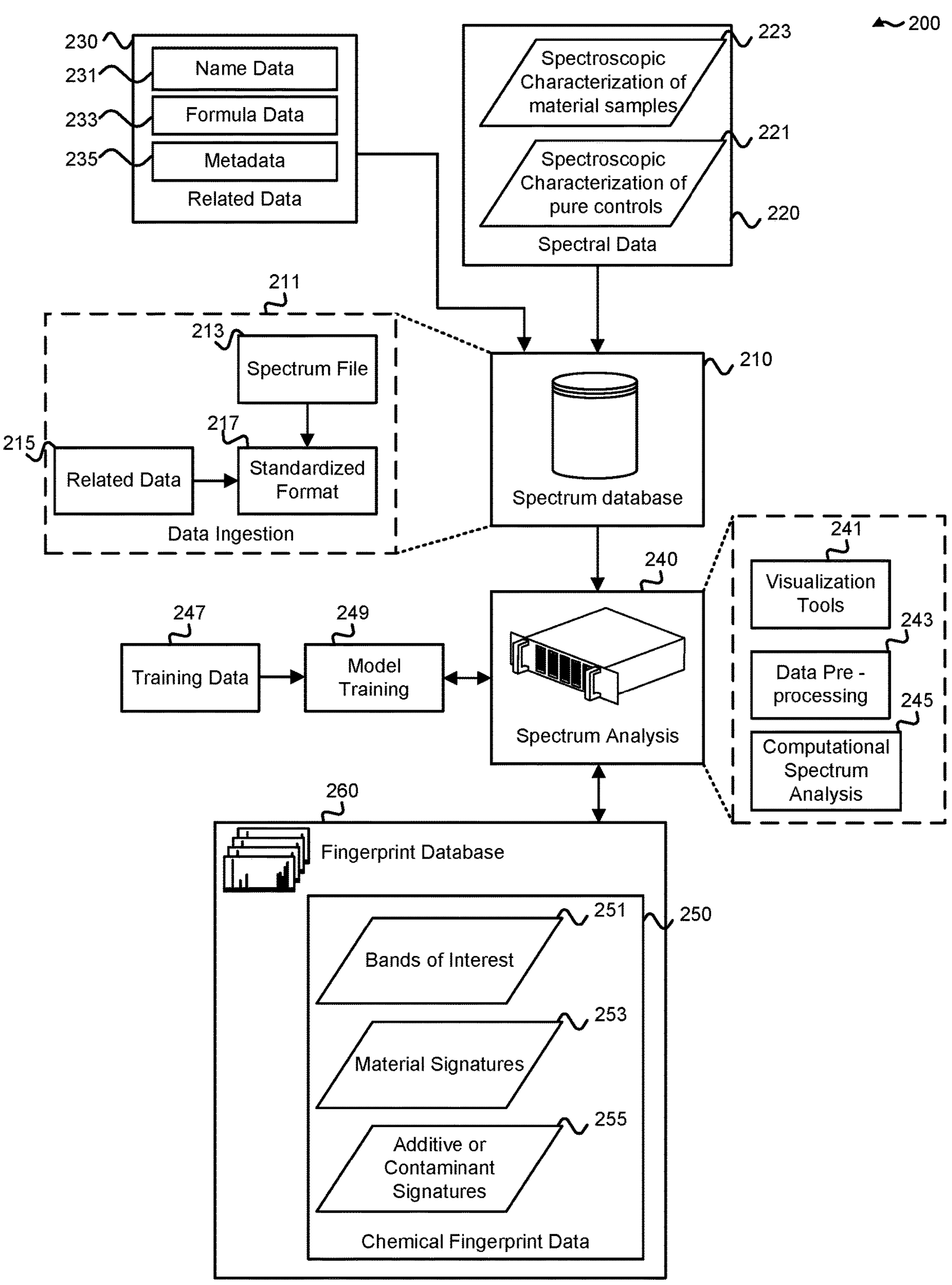
FIG. 2 illustrates an example workflow for predicting a material composition of a feedstock, in accordance with some embodiments of the present disclosure.

FIG. 2 illustrates an example workflow 200 for predicting a material composition of a feedstock, in accordance with some embodiments of the present disclosure. As part of developing and managing a chemical recycling process for a waste material that serves as a feedstock (e.g., waste material 111 of FIG. 1), the workflow 200 may incorporate diverse data sets, data-processing techniques, and analysis operations. The systems implementing the workflow 200 may be or include the computer system described in reference to FIG. 1 (e.g., computer system 120 of FIG. 1) or may be a communicating system, such as a client device hosting a spectral analysis application (e.g., material identification application 140 of FIG. 1). The output data of workflow 200 may facilitate prediction of chemical reaction schemas, as described below, for example, by generating chemical fingerprint data that may be used to identify target products, select candidate chemical reaction unit operations, or gather inventory information from logistics networks, among other uses described in reference to FIG. 1, above.

Operations of the workflow 200 may include one or more data ingestion and processing operations. In some embodiments, a spectrum database 210, which can be an example of database 131 of FIG. 1, may store and process spectral data 220 and related data 230 as part of identifying an experimental material and composition by a spectrum analysis 240 system. The spectral data 220 may be or include calibrated or un-calibrated spectroscopic data, prepared to facilitate generation of chemical fingerprint data 250 by the spectrum analysis system 240. The spectral data 220 may include spectroscopic characterization data of pure controls 221. Pure controls may include base polymer films with no additives or contaminants, also referred to as spectroscopy standards, for a number of individual films, which may be or include polypropylene, polyethylene, polystyrene, high-density polyurethane, low-density polyurethane, polyethylene terephthalate, acrylonitrile butadiene styrene, polycarbonate, or polyamide. Additionally, the spectroscopic characterization data of pure controls 221 may include, but are not limited to, spectroscopic data of control polymer films with a known amount of additives, or even additives alone. Diverse sets of spectral data may also be generated for control samples using multiple modalities across the electromagnetic energy spectrum (X-ray fluorescence, radio frequency, near infrared, short wave infrared, medium wave infrared, THz, or mm ranges), as described above. Molecular and elemental components of control materials may also be characterized and included in the spectroscopic characterization data of pure controls 221.

In some embodiments, spectral data 220 can be or include spectroscopic characterization of material samples 223, which may include data generated by one or more spectroscopic techniques applied to samples of waste materials or their constituent components. For example, deformulation techniques can be applied to further deduce ground truth information on waste materials by using destructive methods like gas chromatography mass spectrometry (GCMS), laser induced breakdown spectroscopy (LIBS), or non-destructive methods (ATR-FTIR). Spectral data 220 may include spectroscopic characterization of material samples 221 collected from a recycling network and progressively provided to the spectrum database 210. For example, a network of materials recycling facilities may collect material characterization data (e.g., characterization data 113 of FIG. 1) as part of an intake or sorting process of waste materials, and may provide the data to the spectrum database 210 as part of implementing the management of chemical recycling across the network.

The spectral data 220 may be coordinated with related data 230, for example, through labelling of spectral data with name data 231, formula data 233, or other metadata 235. In some cases, the related data 230 may correspond to spectral data 220 to facilitate spectral analysis techniques implemented by the spectrum analysis system 240, including, but not limited to, model training techniques, described below. The spectral data 220 and the related data 230 may be stored in separate data stores connected to the spectrum database 210 over a network. For example, the spectral data 220 may be accessed by the spectrum database 210 as part of a distributed data system operation, such as an extract, transform, and load (ETL) process. Similarly, the related data 230 may be collected in one or more databases located in one or more physical locations, and may be accessed or received by the spectrum database 210.

In preparation for subsequent data processing, data ingestion 211 operations may be applied to spectral data 220 and related data 230. For example, data ingestion 211 may include one or more data transformations, such as ETL processes, that may modify the format or representation of the data. For example a spectrum file 213 from spectral data 220 may be joined with associated related data 215 as part of data ingestion 211 to generate a spectrum data entry in a standardized format 217. This may include converting the spectrum file 213 from a standard data format, such as comma separated value format, into a key-value pair format. The key may be or include a searchable database label, such as a unique identifier. The standardized format 217 may include fields for the related data 215, such as labels on chemical composition of the sample. Examples of labels may include, but are not limited to, the name data 231, the formula data 233, molecular weight data, as well as associated meta data 235, such as SMILES string data, MOL file data, CAS numbers, or structural representations.

As illustrated in FIG. 2, the spectrum analysis system 240 may access data in the standardized format 217 as part of generating chemical fingerprint data 250. The spectrum analysis system 240 may generate chemical fingerprint data 250 for standard control materials and characterized waste materials, and may incorporate both automated and manual analysis techniques. For example, the spectrum analysis system 240 may implement a set of visualization tools 241, and may implement machine learning methods or other computational spectrum analysis 245 techniques, as part of developing the chemical fingerprint data 250. The visualization tools 241 may be used to query related spectra for specific materials, additives, or contaminant chemicals. In some embodiments, the visualization tools 241 may display and align a sample spectrum with one or more control spectra for comparison by human eye or by machine image analysis (e.g., by a convolutional neural network trained to classify spectra). Visualization tools 241 may allow rapid analysis for anomaly spectra, as well as manual curation of spectrum data sets used for machine learning as training sets. Visualization tools 241 may permit curated labeling of sample spectra, as when used for refining training sets in reinforced learning.

In some embodiments, spectrum data sets may be normalized through data pre-processing 243 including modular normalization approaches. For example, intensity normalization may be applied on raw spectrum data, based, for example, on identification of key features such as peaks or bands, as part of identifying bands of interest 251. As described below, bands of interest 251 may serve to guide materials characterization systems through configuring spectroscopy probes, and may additionally or alternatively be used in identifying unlabeled spectra detected by broadband characterization techniques. For example, a band of interest 251 for a transmittance scanner can be or include 1620-1787 nm out of 1350-2450 nm, such that the normalization or other data processing may be preferentially applied therein. Similarly, a band of interest 251 for a reflectance scanner can be or include 1117-1261 nm out of 900-1700 nm. Normalization may refer to intensity normalization, and may be applied in situations including, but not limited to, when a spectroscopy sensor device is not intensity calibrated.

Data processing 243 may include baseline and other compensation techniques. For example, a baseline in a spectrum file may be detected, which may correspond to a background signal or general trend in a raw spectrum that is not attributable to the measured sample. In some cases, normalization may include multiple operations, including, but not limited to, baseline subtraction and intensity normalization implemented by dividing the resulting intensity data at each band by the sum of all the differences. In this way, processed spectrum data may be normalized over different material thickness and transparency. Normalized spectra may be smoothed to improve subsequent computational spectrum analysis 245.

In some embodiments, the processed spectrum data may serve as training data 247 for a machine learning model implemented as part of the computational spectrum analysis 245. For example, the machine learning model may be or include a support vector machine (SVM) classifier. The machine learning model may be trained by a model training 249 approach including, but not limited to supervised learning or reinforcement learning, using at least a portion of the normalized spectrum data that may be labeled or unlabeled. In some embodiments, the model training 249 may be implemented using sub-band data, which may provide improved classification accuracy relative to training using complete spectra. Model training 249 may implement adversarial learning approaches, such as a discriminator, that may train machine learning models implemented as part of computational spectrum analysis 245.

The normalized spectrum data may be processed by trained machine learning models or other computational methods, such as procedural or rules-based models, to look for patterns in the signals related to material signatures 253, additive or contaminant signatures 255, or other information indicative of chemical type, composition, morphology, structure, or purity. In materials incorporating multiple different additives, contaminants, or impurities with a main material, such as a unit of recycled PET objects of different forms including diverse plasticizers, such as those received by a material recycling facility, multiple regions covering peak signals of the materials may be identified as bands of interest 251. In some embodiments, as many as 30 to 40 bands of interest 251 may be selected, excluding less informative bands that may be common across all forms of recycling feedstock materials. In an illustrative example, a classifier implementing an SVM trained to classify materials may be provided with the bands of interest 251 for a waste material sample based on a label of the spectrum included during data ingestion 211.

In some embodiments, the chemical fingerprint data 250 may be stored in a fingerprint database 260. The fingerprint database may be in communication with the spectrum analysis system 240, for example, over a network or at the same physical location as the spectrum analysis system 240. As part of implementing the computational spectrum analysis 245, the spectrum analysis system 240 may access chemical fingerprint data 250 stored on the fingerprint database 260. For example, with access to the bands of interest 251 and material signatures 253 for a broad class of materials, such as a polymer, an SVM trained by model training 249 may provide a classification with sufficient accuracy to distinguish between different polymer structures, side-chains, backbones, or other information that may influence the identification of potential target products, as well as the formulation of chemical reactions to convert the material for which the spectral data is being classified into the potential target products, as described below in reference to FIG. 3.

FIG. 3 illustrates an example workflow 300 for generating a set of chemical reaction schemas, in accordance with some embodiments of the present disclosure. As part of managing a chemical recycling process, a computer system (e.g., computer system 120 of FIG. 1) may simulate one or more chemical recycling unit operations as part of a unit operation simulation 310. The unit operation simulation 310 may receive data generated by a material identification and characterization application, as described above, as part of a platform for guiding chemical recycling processes. The workflow 300 may include implementations of machine learning, as well as rules-based models, as part of generating a series of reaction conditions describing chemical processes to convert a feedstock into a target product. The feedstock may be a waste material received by a materials recycling facility. The target product may be identified by the computer system as part of the workflow 300, and may additionally or alternatively be specified by an external input.

The unit operations simulation 310 may receive or access material identification data 320 (e.g., the chemical fingerprint data 250 of FIG. 2) for a waste material, for which the identity and composition of the waste material may serve as inputs 321. The material identification data 320 may include desired inputs 323, which may be provided by an external system, such as via an exchange system, described below in reference to FIG. 4. Unit operations simulation 310 may also receive inputs from a chemical reaction inventory 330. The chemical reaction inventory 330 may store representations, such as embeddings, of all chemical inputs 333 and outputs 335 of reactions, the catalysts 337 and reaction conditions 331 involved. Reaction models 339 may also be stored as part of the chemical reaction inventory 330, which may permit the unit operations simulation 310 to include rules-based reaction models in addition to machine-learning approaches as part of guided chemical recycling 350 formulations. The inputs 333 and outputs 335 may be cross-referenced in the chemical reaction inventory 330, such that the material identification data 320 may be paired with potential target products that may serve to define an initial set of chemical reaction schemas that may be optimized, as described below.

As part of generating optimized reaction conditions 340, unit operations simulations 310 may modify known and widely used reactions and to assist in the exploration and discovery of novel catalysts, reagents, or solvents 343 and reaction conditions 341 that might be applicable to deconstruct waste materials. In some embodiments, the unit operations simulation 310 may incorporate molecular modeling techniques, like density function theory and molecular dynamics to a known set of catalysts or reagents to formulate new catalyst data 337 previously absent from the chemical reaction inventory 330. Unsupervised ML algorithms including various clustering methods, Gaussian Mixture Model, Factor Analysis, and learning reaction embeddings through Deep Neural Networks (DNN), can be applied to data from the chemical reaction inventory 330. In some embodiments, supervised ML algorithms, such as regression models or DNNs, can be used to improve chemical reaction models 339. As described in the context of spectrum analysis (e.g., spectrum analysis system 240 of FIG. 2) machine learning approaches implemented as part of the unit operations simulation 310 may be trained using data sets from the chemical reaction inventory 330, which may include one or more pre-processing steps, such as labelling, curation, or other approaches to select the training data and guide the development of the ML models.

Upon retrieval of recommended catalysts and chemical reactions, multiple approaches may be incorporated in a guided chemical recycling 350 simulation to generate the optimized reaction conditions 340. In some embodiments, one or more chemical processes may be simulated as a series of reaction models 353 *a-n*, each receiving inputs 351 *a-n* and generating outputs 355 *a-n*. Each reaction model 353 may represent a chemical unit operation forming a stage of a chemical recycling process. In some cases, a terminal reaction model 335 *n* may output final outputs, which may represent the target products, as identified from the chemical reaction inventory 330.

In some embodiments, simulation results representing intermediate reaction conditions may be provided to an online learning algorithm to fine-tune models and simulation techniques. The online learning algorithm may incorporate a reward function 360 that may indicate the success of a reaction or a reaction scheme. In some embodiments, the reward function 360 may generate a threshold criterion that represents one or more chemical process parameters, such as inputs 351 or outputs 355, by which the optimization of the overall guided chemical recycling simulation 350 may be judged. For example, one or more inputs 351 or outputs 355 may be provided to the reward function 360 at each iteration, and the unit operations simulation 310 may increment those inputs 351 or outputs 355 until a desired outcome is achieved, such as the output of the reward function 360 crosses a threshold value, which may indicate that the reaction conditions from the guided chemical recycling 350 have been optimized.

In some cases, the outcome may be or include an optimized chemical reaction scheme, such as a pyrolysis process, to efficiently decompose plastics to a desired set of molecules. In another embodiment, the reward function 360 may receive pressure, temperature, and catalyst levels, given inputs of carbon monoxide and hydrogen in a Fischer-Tropsch reaction, to produce liquid hydrocarbons that might be feedstock for plastics. The reward function 360 may be or include general optimization algorithms, such as steepest descent, to guide incrementation of inputs 351 and outputs 355. Algorithms specific to each type of chemical reaction problem, depending on the input/output data desired, or conditions needing optimization may also be included. For example, simulation of thermochemical processes for which sufficient process data is available, such as pyrolysis, may use a different optimization technique, like reinforcement learning. The reward function 360 may form a part of ML frameworks of the workflow 300, such as reinforcement learning or black/grey box optimization techniques, and may be used to guide the learning process and evaluate learning outcomes.

The reward function 360 may receive numerous inputs, other than those included as inputs 351 to reaction models 353. For example, derived values, such as yield, selectivity, feasibility, energy usage, or environmental impact, may serve as inputs to the reward function 360. As an example, yield may be used to determine how much of a plastic polymer may be successfully converted into its constituent monomers, and how much may be converted to unusable byproducts. Similarly, selectivity may describe a ratio of desired monomer outputs to undesired reaction outputs. Feasibility may be used to capture the notion of whether the proposed reaction conditions are feasible/practical to set up or execute, which demonstrates that some inputs to the reward function 360 may be qualitative assessments based on non-physical criteria. Weights can be assigned to the inputs to the reward function 360 parameters to bias the reward function (and learning process) towards specific goals or objectives. For example, if there are constraints on selectivity for certain reaction types, then selectivity can be assigned a higher weight in calculation of the threshold criterion. In other cases, yield might be more important and may be assigned a higher weight.

The workflow 300 may include multiple outputs in addition to the optimized reaction conditions, which may improve the implementation and adoption and performance of chemical recycling processes. For example, the optimized reaction conditions 340 may be visualized as a Markov process simulation 370, by which the various stages of a chemical reaction scheme 345 as steps in a Markov process.

A Markov process, in general terms, represents different stages in a logistical or process chain as nodes connected by directional arrows, with an indication, either visual or quantitative, of a weight of the connection between the respective nodes. In this way, the Markov process simulation 370 may generate and/or present a dynamic visualization of a reaction scheme 345 to demonstrate a holistic effect of fine tuning a constituent reaction of the reaction scheme 345 on an entire recycling pipeline. As such, the Markov process simulation 370 may receive as an input logistical data describing a material recycling supply chain, as described in more detail in reference to FIG. 4, below.

Figure 4:
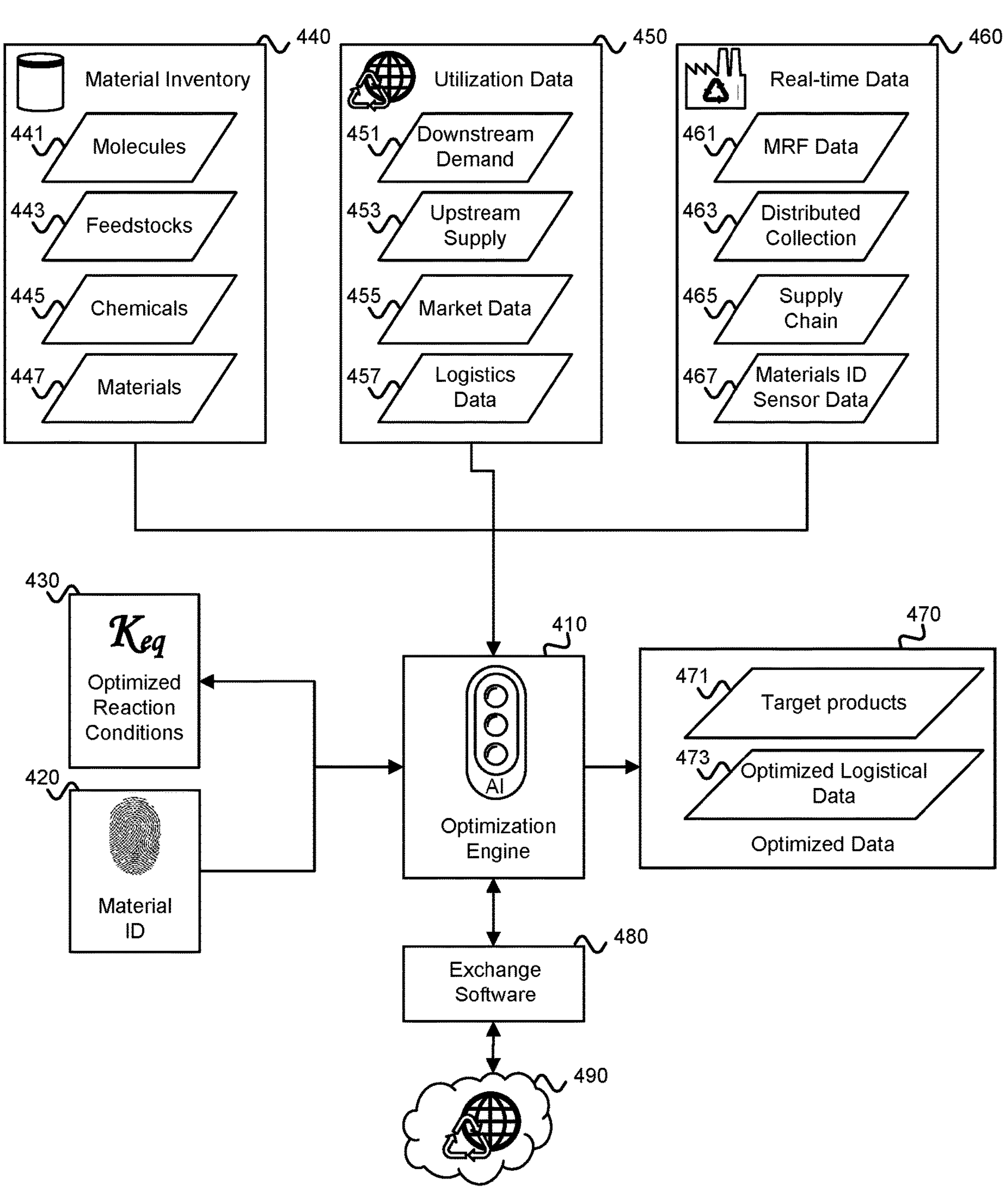
FIG. 4 illustrates an example workflow for tuning a chemical reaction process using chemical and logistical data, in accordance with some embodiments of the present disclosure.

FIG. 4 illustrates an example workflow 400 for tuning a chemical reaction process using chemical and logistical data, in accordance with some embodiments of the present disclosure. The elements of the workflow 400 may include data provided by logistical networks and databases described in the preceding figures that, together, may serve as inputs to an optimization engine 410. The optimization engine 410 may implement one or more approaches, as described below, to modify or tune the chemical recycling processes simulated by the systems in the preceding figures to better align with network factors, such as material inventory levels, logistical constraints, or consumption trends. The outputs of the workflow 400 may be returned to one or more of the preceding systems as inputs, for example, during iteration of the unit operations simulation 310 of FIG. 3.

In some embodiments, the optimization engine 410 may receive data that can be broadly grouped into chemical recycling process data, such as material identification data 420 (e.g., chemical fingerprint data 250 of FIG. 2) or optimized reaction conditions 430 (e.g., optimized reaction conditions 340 of FIG. 3), and logistical data, such as material inventory 440 data, utilization data 450, or real-time data 460. The optimization engine 410 may apply one or more computational approaches to modify aspects of the optimized reaction conditions 430 and to output optimized data 470. In some embodiments, the optimization engine may receive additional inputs provided by exchange software 480, which may provide a platform for interaction with a network of entities 490 that produce feedstock materials, consume products, or produce chemical recycling intermediate materials including, but not limited to, catalysts, solvents, or other consumables.

The material inventory data 440 may include, but is not limited to, inventory data describing molecules 441, which may describe products, or byproducts, feedstock materials 443, chemicals 445, such as consumables, catalysts, or other reactants, or general materials 447. General materials may include, but are not limited to other materials that may be used in operating a chemical recycling process, such as electricity, cooling water, heating fuel, or compressed gases. In this way, the material inventory 440 may represent one or more constraints on the operation of the chemical recycling process identified in the optimized reaction conditions 430. As such, the information reflected in the material inventory 440 may potentially counter-indicate the optimized reaction conditions, for example, when a supply of rate limiting catalyst is unavailable.

Similarly, the utilization data 450 may reflect local or regional trends in chemical recycling infrastructure that may promote or demote a reaction scheme (e.g., reaction scheme 345 of FIG. 3). For example, utilization data 450 may include, but is not limited to, data reflecting downstream demand 451, upstream supply 453, market data 453, or logistics data 455. Such supply, demand, and market factors may permit the optimization engine to tune one or more parameters of chemical recycling process simulations to reflect economic factors, in addition to physical and chemical factors reflected by reaction models and thermochemical optimization. For example, a reaction scheme may generate a product for which the supply already exceeds the demand and for which warehouse capacity is lacking in a logistical network. In such cases, the optimization engine 410 may demote the reaction scheme, or may identify a subset of target products 471. In turn, the subset of target products 471 may be returned to chemical process simulations (e.g., workflow 300 of FIG. 3) to tune the optimized reaction conditions 430.

The optimized reaction conditions 430, as described in reference to FIG. 3, may describe the specific conditions for a single chemical reaction scheme. That being said, the optimization engine 410 may receive or access multiple chemical reaction schemas simultaneously, as part of selecting an implementation scheme or multiple implementation schemas as described in reference to FIG. 1, above. For example, identifying the subset of target products 471 may permit the selection of an implementation scheme that generates the subset of target products 471.

Similarly, the optimization engine 410 may output optimized logistical data, which may describe sources of feedstocks 443 and recipients of products generated by the optimized reaction conditions 430. For example, the logistical data may include real time data 460 that may include, but is not limited to, data describing materials recycling facility (MRF) 461 operations, distributed collection 463 operations, supply chain 465 conditions, or materials characterization sensor data 467, the last of which may describe, in real time, the materials arriving in MRF processing. In contrast, distributed collection 463 data may describe the diverse sources of waste material feedstocks, such as industrial, commercial, institutional, and domestic sources. The real time data 460, coupled with input from the exchange software 480, may permit the optimization engine 410 to designate recipients of products as well as sources of feedstocks for the entities participating in a chemical recycling network (e.g., through the network of entities 490).

The optimization engine 410 may implement a fitness function including one or more computational techniques, such as rules-based models or machine learning models, to input the multiple types of chemical recycling process data and logistical data available, and to generate a fitness value for the optimized reaction conditions 430. Similar to the reward function described in reference to FIG. 3 (reward function 360 of FIG. 3) the optimization engine 410 may receive weighted inputs, whose weights may be prescribed externally by a human operator or an autonomous system, or may be developed by training the optimization engine 410 in cases where machine learning approaches are employed. For example, the optimization engine may include an artificial neural network trained on a set of training data that may be developed from historical operations data gathered for a given chemical recycling process. The training may permit the optimization engine to develop weights for inputs corresponding, for example, to process sensitivities to various logistical data, such as material inventory 440 or to market data 455. For example, inventory data for a rate-limiting catalyst may exert a significant influence the feasibility of a chemical reaction scheme. In such cases, a weight for an input describing supply of the catalyst may by higher than that of a less influential input. In the context of a loss function, the optimization engine may operate by minimizing a value of the loss function, defined as an output of a machine learning model that receives the chemical recycling process data and the logistical data.

Figure 5:
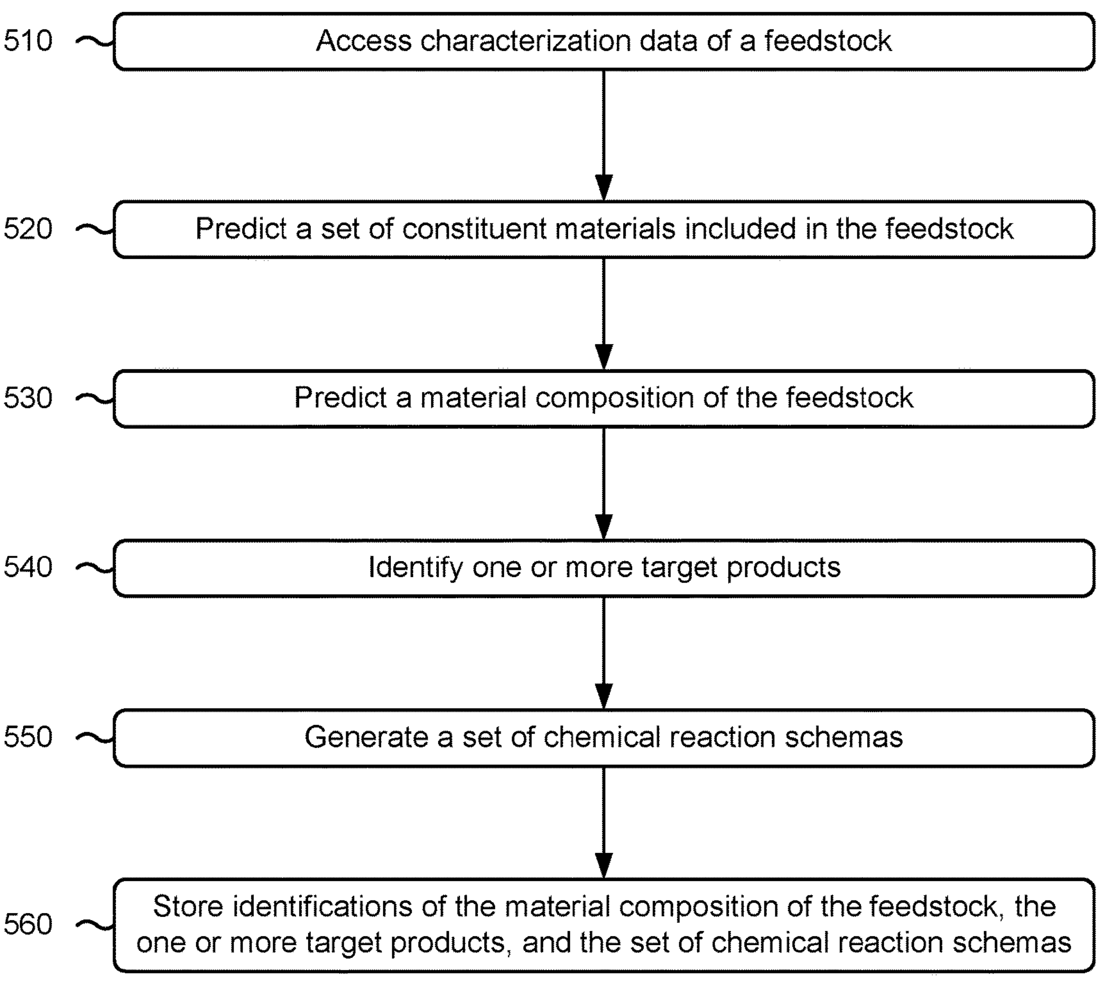
FIG. 5 illustrates an example flow describing a method for managing reuse of molecular components of a feedstock, in accordance with some embodiments of the present disclosure.

FIG. 5 illustrates an example flow describing a method 500 for managing reuse of molecular components of a feedstock, in accordance with some embodiments of the present disclosure. As described in reference to FIGS. 1-4, one or more operations making up the method 500 may be executed by a computer system (e.g., computer system 120 of FIG. 1) in communication with additional systems including, but not limited to, characterization systems, network infrastructure, databases, and user interface devices. In some embodiments, the method 500 includes operation 510, wherein the computer system accesses characterization data of a feedstock. The characterization data (e.g., characterization data 113 of FIG. 1) may be generated by in-situ spectroscopic techniques, such as reflectance spectroscopy, transmission spectroscopy, or fluorescence spectroscopy, in one or more wavelength modalities, as described above. Furthermore, characterization data may include physical or chemical information based on one or more different techniques, examples of which include hardness, tensile properties, or thermal-phase properties. The characterization data may be provided to the computer system over a network (e.g., network 130 of FIG. 1).

In some embodiments, the method 500 includes operation 520, wherein the computer system predicts a set of constituent materials included in the feedstock. The computer system may implement spectral analysis approaches, as described in more detail in reference to FIG. 2, to identify chemical fingerprint data (e.g., chemical fingerprint data 250 of FIG. 2). This may include a receiving standard and control data from a database of spectra (e.g., database 131 of FIG. 1). Furthermore, operation 520 may include one or more implementations of data transformation operations (e.g., data ingestion 211 of FIG. 2), machine learning models, which may be trained using pre-processed training data (e.g., training data 247 of FIG. 2) prepared using spectral analysis techniques including, but not limited to normalization, baseline subtraction, or smoothing.

In some embodiments, the method 500 includes operation 530, wherein the computer system predicts a material composition of the feedstock. The material composition of the feedstock, in contrast to the constituent materials, may include information about relative prevalence in the feedstock. For example, spectral analysis described in reference to FIG. 2 may identify a number of constituent materials based on spectral features, such as material signatures (e.g., material signatures 253 of FIG. 2) or additive signatures (e.g., additive signatures 255 of FIG. 2). Such spectral analysis may be unable, however, to differentiate between principle components and impurities, for example, when the sensor is not intensity-calibrated. In some cases, therefore, cross referencing spectral fingerprints with control data, or training machine learning models with composition data, may provide predicted compositions, such as composition by weight, of the feedstock.

In some embodiments, the method 500 includes operation 540, wherein the computer system identifies one or more target products. Identifying target products may be facilitated by a chemical reaction inventory (e.g., chemical reaction inventory 330 of FIG. 3), which may permit the computer system to identify a set of candidate products for the feedstock. For example, a material composition may include information about a principle component, which may be a polymeric material, for which the chemical reaction inventory may describe numerous outputs (e.g., outputs 335 of FIG. 3) that can be generated by chemical recycling of the feedstock. Similarly, information describing catalysts (e.g., catalysts 337 of FIG. 3) may describe contaminants that may poison the catalysts, and, as such, may eliminate the respective chemical reaction and its products from the set of candidate products. As described above, halogen containing plastics (e.g., chlorine and fluorine containing plastics) may produce corrosive byproducts that may exclude them from some types of chemical recycling. As described above, the set of candidate products may be refined in one or more ways, using logistical data (e.g., material inventory 440 of FIG. 4), which may permit the identification of a limited number, or an incomplete subset, of target products.

In some embodiments, the method 500 includes operation 550, wherein the computer system generates a set of chemical reaction schemas. Based on the material composition and the target products, the computer system may generate tuned reaction schemas using the techniques described in reference to FIG. 3, above (e.g., workflow 300 of FIG. 3). For example, a chemical recycling process may be simulated as a series of unit operations represented as reaction models (e.g., reaction models 353 *a-n* of FIG. 3). In some cases, a reaction model may receive an output of a preceding reaction model of the series as an input, as when a unit operation forms a stage in a process flow. As described in more detail in reference to FIG. 3, the unit operations simulation (e.g., unit operations simulation 310 of FIG. 3) may be tuned by a reward function (e.g., reward function 360 of FIG. 3) that may permit multiple factors to influence the operation of a given reaction scheme during tuning. For example, the reward function may receive as inputs chemical and physical information, such as cooling water source capacity, fuel consumption information, environmental impact parameters, or other inputs that may influence the operation of the constituent process unit reaction models directly. In addition, the reward function may permit the unit operations simulation to optimize for derived values including, but not limited to, yield, selectivity, or efficiency.

In some embodiments, the method 500 includes operation 560, wherein the computer system stores identifications of the material composition of the feedstock, the one or more target products and the set of chemical reaction schemas. The outputs generated by the computer system may include, but are not limited to, the reaction schemas, visualization information (e.g., Markov process simulation 370 of FIG. 3), as well as the material composition, constituent materials, and other predicted and generated data. In some embodiments, the data thus generated may be stored by the computer system in a data store, sent to an external computer system (e.g., external computer system 170 of FIG. 1) or returned as feedback data during iteration of simulations. Furthermore, material identification data, reaction schema data, target product data, or other generated information may be stored for subsequent use in model training at one or more stages of the method 500.

In the preceding description, various embodiments have been described. For purposes of explanation, specific configurations and details have been set forth in order to provide a thorough understanding of the embodiments. However, it will also be apparent to one skilled in the art that the embodiments may be practiced without the specific details. Furthermore, well-known features may have been omitted or simplified in order not to obscure the embodiment being described. While example embodiments described herein center on polymeric materials, these are meant as non-limiting, illustrative embodiments. Embodiments of the present disclosure are not limited to such materials, but rather are intended to address material processing operations for which a wide array of materials serve as potential feedstocks for a material recycling and/or up-cycling process. Such materials may include, but are not limited to, metals, bio-polymers such as ligno-cellulosic materials, visco-elastic materials, minerals such as rare earth containing materials, as well as complex composite materials or devices.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes and workflows disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the description to provide a thorough understanding of the embodiments. However, it will be understood that the embodiments may be practiced without these specific details. For example, specific computational models, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A method for dynamically configuring a chemical recycling process, the method comprising:

determining characterization data from a plurality of feedstocks received at a materials recycling distribution facility by performing one or more analytical methods on the plurality of feedstocks, wherein individual feedstocks of the plurality of feedstocks comprise a plurality of waste materials;

accessing the characterization data of a feedstock of the plurality of feedstocks, the characterization data comprising one or more spectral data sets of the feedstock from a plurality of spectral data sets stored within a spectrum database in a computer network, wherein the one or more spectral data sets are collected according to one or more spectroscopic methods;

predicting, using the characterization data, a material composition of the feedstock, wherein the material composition identifies a predicted set of constituent materials;

identifying, at least in part using the predicted material composition of the feedstock, one or more target products based on a set of molecular structural data for the predicted set of constituent materials contained within a set of chemical fingerprint data, wherein the set of molecular structural data is identified using a machine learning model, wherein the machine learning model is trained by using a supervised learning regime or by using sub-band data derived from the one or more spectrum data;

generating a set of candidate chemical reaction schemas enabling a conversion of at least part of the feedstock into the one or more target products, wherein the set of candidate chemical reaction schemas are generated by the machine learning model;

simulating a set of candidate unit operations represented as a set of coupled reaction models, wherein the set of candidate unit operations implements each candidate chemical reaction schema of the set of candidate chemical reaction schemas to convert the predicted material composition of the feedstock into the one or more target products;

directing the feedstock to one or more materials recycling facility destinations;

decomposing the feedstock to the constituent materials at the one or more materials recycling facility destinations operational to perform at least one unit operation from the set of candidate unit operations;

converting the constituent materials to the one or more target products at the one or more materials recycling facility destinations operational to perform at least one unit operation from the set of candidate unit operations, wherein the one or more materials recycling facility destinations is selected by performing an optimization of the set of candidate chemical reaction schemas to produce a set of optimized chemical reaction schemas, wherein the optimization is based in part on a determination that an output of a reward function exceeds a pre-defined threshold value, and wherein the optimization is also based in part on one or more economic factors, wherein data representing the one or more economic factors comprise a set of utilization data comprising:

a set of market demand data for the one or more target products;

a set of inventory data describing an availability of one or more inputs to the set of candidate chemical reaction schemas;

a set of logistical data comprising a set of recycling feedstock availability data and warehouse storage availability data; and a set of real time data comprising a set of status data for one or more available recycling facilities to produce the one or more target products.

2. The method of claim 1, further comprising:

identifying one or more inputs to a fitness function, the one or more inputs describing the optimized chemical reaction schema of the set of candidate chemical reaction schemas;

generating an output of the fitness function using the one or more inputs; and selecting an implementation scheme from the set of candidate chemical reaction schemas according to the output of the fitness function, the one or more inputs, and the one or more target products.

3. The method of claim 2, wherein the set of candidate chemical reaction schemas are optimized in real time by a computer system to assess the one or more materials recycling facility destinations for recycling the feedstock, wherein the one or more materials recycling facility destinations are determined by one or more fitness values generated by the fitness function implemented by an optimization engine, wherein the one or more fitness values are included as an output by the optimization engine.

4. The method of claim 1, wherein identifying the one or more target products comprises:

accessing a set of inventory information data describing a set of products; and identifying a subset of the set of products as the one or more target products using the set of inventory information data.

5. The method of claim 1, wherein predicting the set of constituent materials included in the feedstock comprises:

accessing a library of the spectrum data and associated metadata corresponding to the one or more spectroscopic methods, wherein the library of the spectrum data is stored in a spectrum database that is stored within the computer network;

identifying a band in one or more spectra of the spectrum data using the first machine learning model; and matching the band to a spectrum of the library of the spectrum data to predict a constituent material of the set of constituent materials using the first machine learning model.

6. The method of claim 1, wherein generating the set of candidate chemical reaction schemas comprises:

accessing a chemical reaction inventory comprising representations of chemical reactions describing the conversion of the feedstock to a target product of the one or more target products, wherein the chemical reaction inventory is stored in a chemical inventory database that is stored within the computer network; and populating the set of candidate of chemical reaction schemas from the chemical reaction inventory, wherein the set of candidate chemical reaction schemas is stored in a chemical reaction schema database that is stored with the computer network.

7. The method of claim 1, wherein the reward function is provided with one or more inputs and outputs of the simulation of each chemical reaction schema of the set of candidate chemical reaction schemas, wherein the optimization is based at least in part on iteratively refining the one or more inputs of the simulation to obtain an optimized output of the simulation, wherein the one or more inputs to the simulation is iteratively incremented such that the one or more outputs of the simulation is iteratively changed until the output of the reward function exceeds the pre-defined threshold value, and wherein the one or more inputs to the simulation comprise one or more reaction conditions, one or more catalysts, or one or more reaction models.

8. The method of claim 1, wherein the machine learning model includes a convolutional neural network trained on the dataset of molecular structural patterns and spectroscopic data.

9. The method of claim 1, wherein the machine learning model includes a reinforcement learning model configured to simulate chemical reactions, optimize target product yield or reduce byproduct generation.

10. The method of claim 1, wherein the reward function receives any of yield data, selectivity data, pressure data, temperature data and catalyst level data from the candidate unit operations simulations.

11. The method of claim 1, wherein decomposing the feedstock to the constituent materials comprises depolymerizing the feedstock to the constituent materials.

12. The method of claim 11, wherein depolymerizing the feedstock comprises pyrolyzing the feedstock to the constituent materials.

13. The method of claim 1, wherein performing the optimization of the set of candidate chemical reaction schemas comprises performing a first optimization of the set of candidate chemical reaction schemas based on the determination that the output of the reward function exceeds a pre-defined threshold value, and performing a second optimization of the set of candidate chemical reaction schemas based on the one or more economic factors.

14. The method of claim 1, wherein the set of status data is a first set of status data, and a second set of status data for one or more recycling facilities of the one or more target products.

15. The method of claim 1, further comprising triggering a redirection of the feedstock from a recipient destination to another recipient destination based on the optimized set of candidate chemical reaction schemas.

16. The method of claim 1, wherein the set of candidate reaction schemas combine the machine learning model with first-principles models based on chemical rate equations.

* * * * *